Oct. 12, 1971  E. M. WOODFORD  3,611,641
HEAVY DUTY TAILSTOCK

Filed Oct. 31, 1968  4 Sheets-Sheet 1

INVENTOR
ERNEST M. WOODFORD

BY Mason, Porter, Diller & Brown
ATTORNEYS

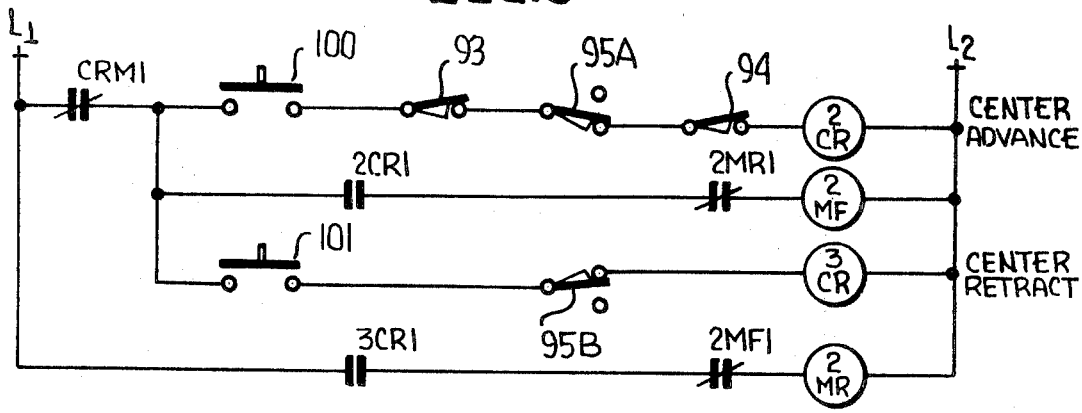
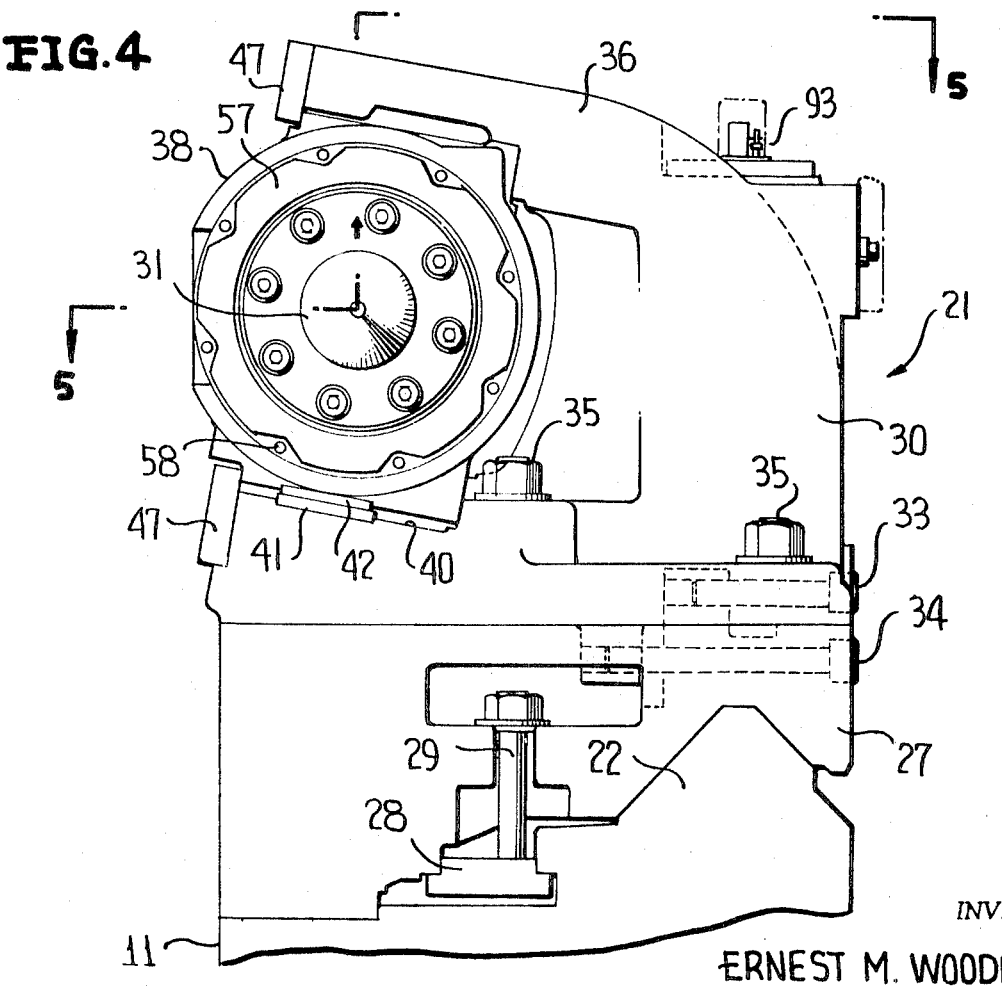

INVENTOR
ERNEST M. WOODFORD
BY
Mason, Porter, Diller & Brown
ATTORNEYS

INVENTOR
ERNEST M. WOODFORD
BY Mason, Porter, Diller & Brown
ATTORNEYS

United States Patent Office 3,611,641
Patented Oct. 12, 1971

3,611,641
HEAVY DUTY TAILSTOCK
Ernest M. Woodford, Waynesboro, Pa., assignor to
Landis Tool Company, Waynesboro, Pa.
Filed Oct. 31, 1968, Ser. No. 772,141
Int. Cl. B24b 5/14, 41/06
U.S. Cl. 51—49                                10 Claims

ABSTRACT OF THE DISCLOSURE

This disclosure relates to a heavy duty tailstock for machine tools, the tailstock being particularly adapted for supporting one end of a heavy workpiece. The tailstock is comprised of base members which are longitudinally positioned and secured to ways of a machine tool bed. An upper tailstock base member supports a support member or chock which is slidably mounted on slanted ways of the upper tailstock base member for longitudinal movement. The slanted ways are declined away from the general position of a tool support of the machine tool whereby the weight of the chock and that of the supported workpiece locks the chock against the slanted ways and prevents any cross movement or shifting of the chock. The chock houses a live work center, large spindle and bearings, or can be arranged to accept a dead work center. The chock is shifted longitudinally by mechanical means to engage the work center against the workpiece. The tailstock construction has eliminated that portion of the upper base member which would normally oppose the tool support, permitting increased bearing sizes and greater weight carrying capacity of the tailstock without increasing the width of the upper base member.

This invention relates in general to a machine tool that machines heavy workpieces, and more particularly, to a heavy duty tailstock having a work center to support one end of a workpiece.

It will be readily apparent that in machine tools of the type to which this invention relates, when the tailstock has a live work center, the spindle and bearings thereof must be of maximum capacity to support the largest workpiece to be machined. However, prior to this invention, the tailstock housing was increased in over-all size to house the increased size of the spindle and bearings when the weight carrying capacity thereof was increased. Undesirably, as the width of the tailstock housing was increased, interference between the tool support and tool of the machine tool and the housing increased which limited the minimum diameter that could be machined on the ends of the workpiece.

At this time it is pointed out that although the specific tailstock construction of this invention can be utilized in various types of machine tools, the invention finds particular application in grinders.

In the preferred form of the invention, in which heavy workpieces are firmly supported between work centers, the workpiece is normally driven from the headstock by means of a work driver in a conventional manner. In brief, the tailstock is comprised of an upper base member which supports a support member or chock and a lower base member secured to the ways of the bed of the machine tool. The upper base member has mounted therein for longitudinal movement a support member or chock which carries a work center. The chock and the associated work center are longitudinally positioned by means of an electric motor and mechanical means to position the work center against the workpiece prior to the machining operation, and to retract the work center in preparation for the next workpiece.

In view of the foregoing, it is the primary object of this invention to increase the work carrying capacity of the tailstock by providing means to increase the diameter of spindle and bearings and at the same time to eliminate any increase in interference between the tailstock and the grinding wheel support by specially constructing the tailstock to receive the increased diameter spindle and bearings without increasing the radial dimension of the portion of the tailstock facing the wheel support.

Another object of this invention is to provide mechanical and hydraulic means to longitudinally position and center the slidable chock member and work center against the workpiece.

A further and most important object of this invention is to so construct the tailstock housing and the chock whereby the chock is supported in the tailstock housing on slanted ways with the weight of the chock and a supported workpiece serving to firmly seat and lock the chock against the slanted ways and thus prevent transverse movement or shifting of the chock during the grinding of the workpiece supported by the tailstock.

With the above and other objects in view that will hereinafter appear, the nature of the invention will be more clearly understood by reference to the following detailed description, the appended claims and the several views illustrated in the accompanying drawings.

In the drawings:

FIG. 3 is a wiring schematic showing the tailstock control circuitry.

FIG. 4 is an enlarged end view of the tailstock as viewed from the left in FIG. 1 and with parts thereof broken away and shown in section.

Figure 1:
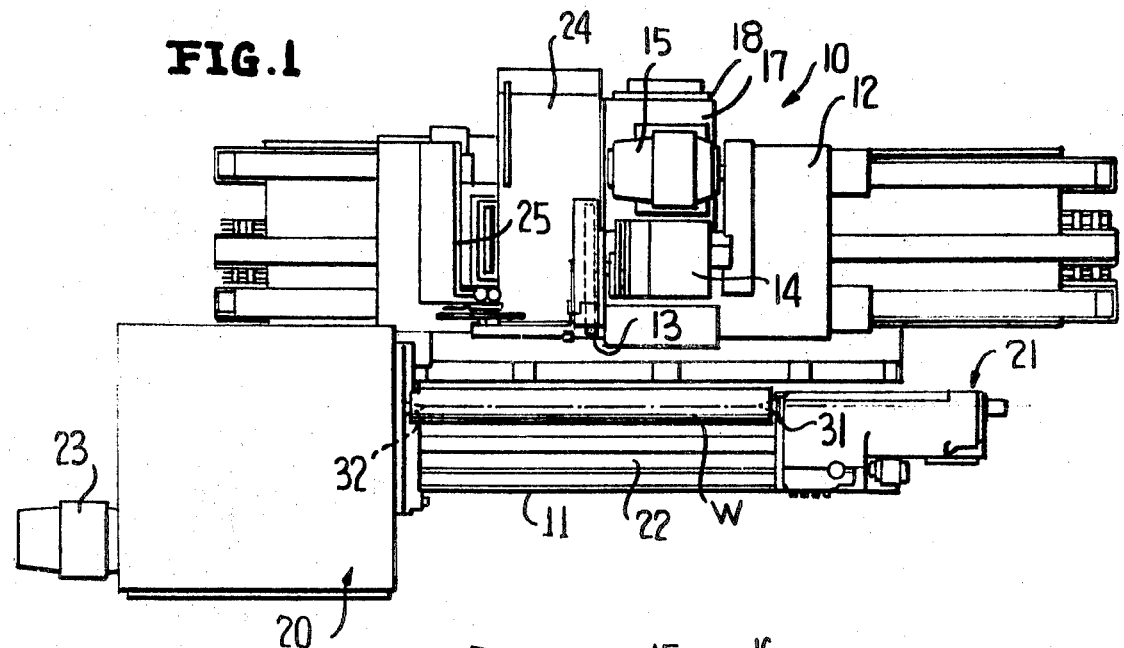
FIG. 1 is a plan view of a roll grinding machine and shows a typical usage of the tailstock of this invention.

Referring now to the drawings in detail, it will be seen that there is illustrated in FIG. 1 a roll grinder, the roll grinder being generally identified by the numeral 10. The roll grinder 10 includes a bed 11 on which a carriage 12 is slidably mounted for longitudinal movement. A grinding wheel 13 is mounted on a spindle for rotation with the spindle being supported by a wheel support 14. The wheel support 14, together with a motor 15 for driving the spindle of the grinding wheel 13, is mounted on a base 16. The base 16, in turn, is mounted on a sub-base 17. The sub-base 17 is suitably mounted on the taper carriage 18 for movement towards and away from a roll or workpiece W to be ground. The taper carriage 18 is mounted on a swivel table (not shown) to permit swiveling the grinding wheel 13 and base 16 for grinding tapers.

The workpiece W is rotatably supported between a headstock 20 and a tailstock 21, the tailstock 21 being the subject of this invention. The tailstock 21 is mounted on ways 22 of the bed 11 for longitudinal adjustment relative to the headstock 20 so as to facilitate the supporting of workpieces of different lengths. It is to be understood that the headstock 20 is provided with suitable drive means for effecting the rotation of the workpiece W and accordingly, the headstock 20 includes a headstock motor 23.

It is also pointed out that the roll grinder 10 includes an operator's platform 24 along which there is mounted centralized machine controls 25 for controlling various machine functions.

Figure 2:
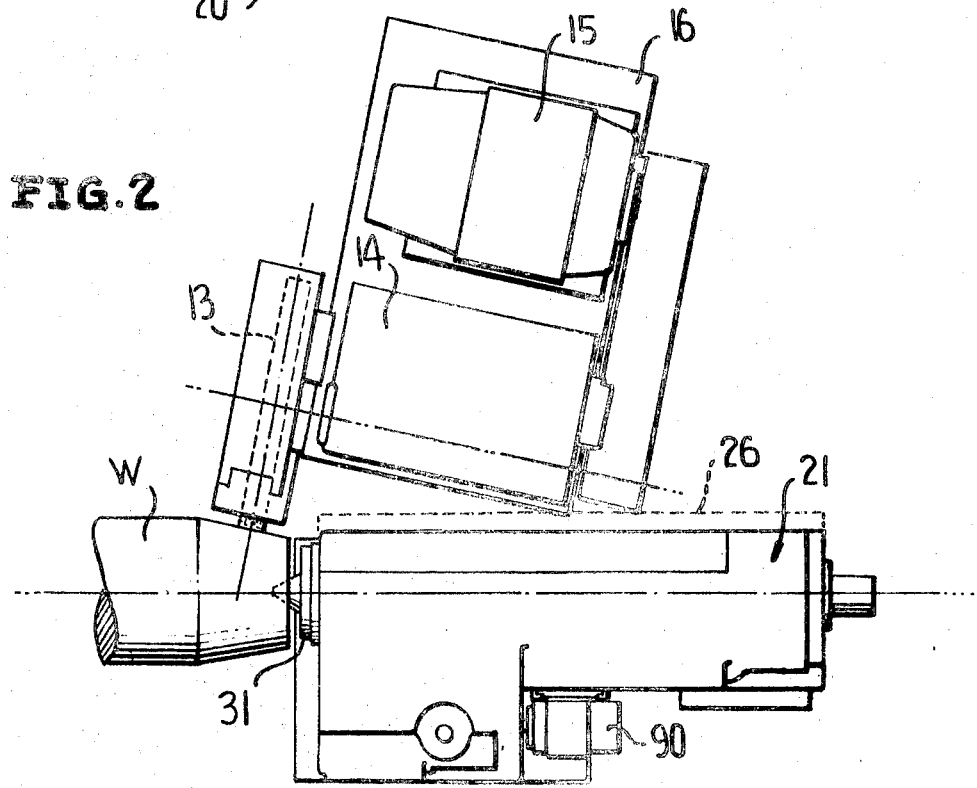
FIG. 2 is an enlarged schematic plan view showing the roll grinding machine of FIG. 1 grinding a taper on an end of a relatively small diameter roll and wherein the tailstock provides the necessary clearance for such grinding operation.

Referring now to FIG. 2 in particular, it will be seen that there is schematically illustrated the problem which is solved by this invention. When the roll grinder 10 is provided with a tailstock of a sufficiently large construction to support very heavy rolls for which the roll grinder 10 is intended, the tailstock, if constructed in the normal manner, is relatively large and would extend towards the general path of movement of the grinding wheel 13 and the supporting structure therefor to the position indicated by the dotted line 26. It will be readily apparent that when it is desired to grind tapers on the ends of relatively small rolls, there would be an interference between part of the supporting structure for the grinding wheel 13 and the tailstock 21. However, as is schematically shown in FIG. 2, the construction of the tailstock 21 is such as to provide this additional necessary clearance.

It is also pointed out at this time that the additional clearance provided by the tailstock 21 permits the use of smaller diameter grinding wheels than would be permitted by a normally constructed tailstock. Therefore, the grinding wheel 13 may be worn to a much greater extent before it is replaced.

Referring now to FIG. 4 in particular, it will be seen that the tailstock 21 includes a lower base 27 which is seated directly on the ways 22 of the base 11. This permits longitudinal adjustment of the tailstock 21 towards and away from the headstock 20. The lower base 27 is retained for longitudinal adjustment on the ways 22 by means of a clamp bar 28 and one or more clamp bolts 29.

The tailstock 21 also includes an upper base 30 which is seated on the lower base 27 and which is transversely adjustable relative thereto to align a work center 31 thereof with a work center 32 of the headstock 20. Transverse adjustment of the upper base 30 with respect to the lower base 27 is accomplished by means of a pair of adjusting screws 33 and 34 which are carried by the upper base 30 and the lower base 27, respectively. The upper base 30 is locked in a transversely adjusted position with respect to the lower base 27 by means of suitable clamp bolts 35.

Figure 7:
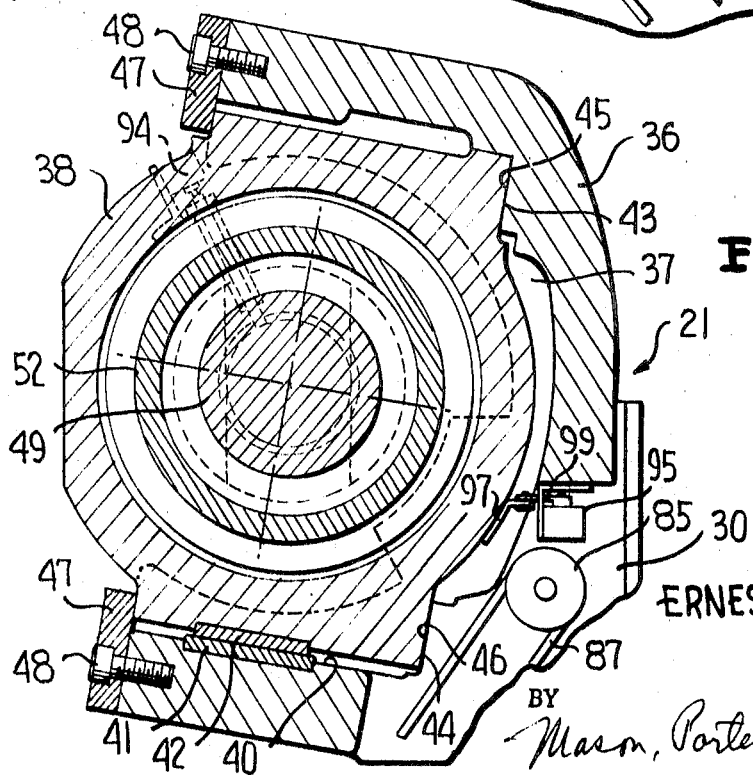
FIG. 7 is a fragmentary transverse sectional view taken along the line 7—7 of FIG. 5 and shows the specific mounting of the chock within the tailstock housing.

Referring now to FIG. 7 in particular, it will be seen that the upper base 30 includes a housing 36 which is of a substantially rectangular C-shaped cross section. The housing 36 defines an opening 37 in which a support member or chock 38 is positioned for longitudinal adjustment. It is to be noted that the chock 38 is generally rectangular in section and is adapted to be seated within the housing 36 in a manner wherein it is fully supported by the housing notwithstanding the C-shaped cross section of the housing.

It is to be noted that the housing 36 is rotated slightly from the horizontal so as to provide a slanted way 40 for the chock 38. The slanted way 40 is provided with a hardened wear strip 41 which is partially seated therein and is suitably secured thereto. The base of the chock 38 is also provided with a hardened wear strip 42 which is in mating face-to-face engagement with the wear strip 41. It will be readily apparent that the wear strips 41 and 42 provide long life to the sliding surfaces of the housing 36 and the chock 38.

It is also to be noted that the chock 38 has generally upstanding surfaces 43 and 44 facing away from the general path of the supporting structure for the grinding wheel 13. The surfaces 43 and 44 of the chock 38 engage mating surfaces 45 and 46, respectively, formed on the inner surface of the near vertical wall of the housing 36.

From the foregoing, it will be readily apparent that the chock 38 is supported within the housing 36 by a generally V-shaped arrangement of support surfaces. It is also to be understood that due to the specific orientation of the housing 36 and the chock 38, the weight of the chock 38, as well as the weight of the supported portion of a workpiece, is primarily carried by the wear strips 41 and 42.

It is also to be noted that the housing 36 is provided with chock guide members 47 which are removably secured to the housing 36 along the open face thereof by means of fasteners 48. The chock guide members 47 project generally into the open face of the housing 36 and function as upper and lower retainers for the chock 38. The chock guide members 47 function to prevent any cross movement of the chock 38 in a horizontal plane.

Figure 5:
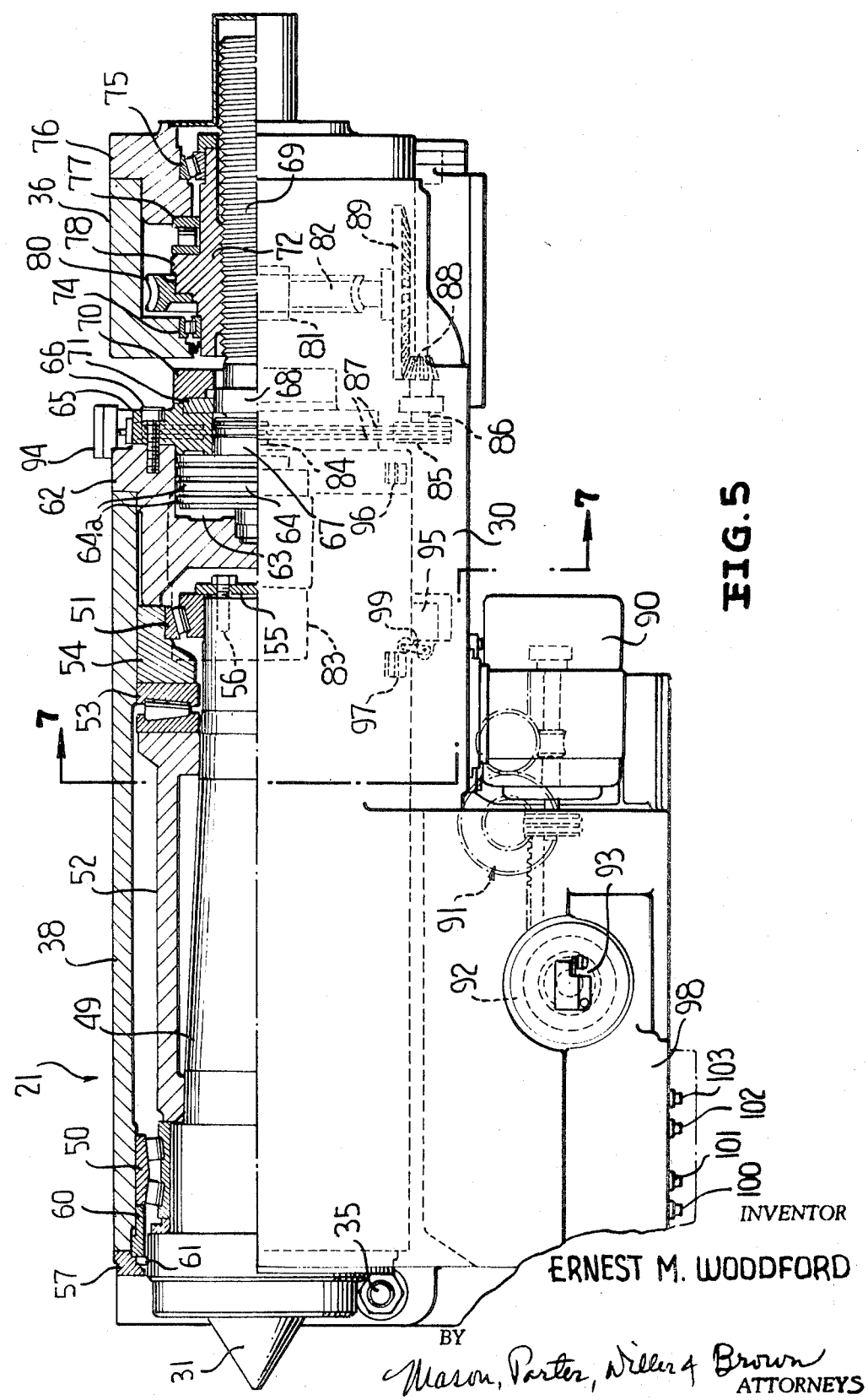
FIG. 5 is a longitudinal sectional view taken along the line 5—5 of FIG. 4 and shows the internal construction of the tailstock.
Figure 6:
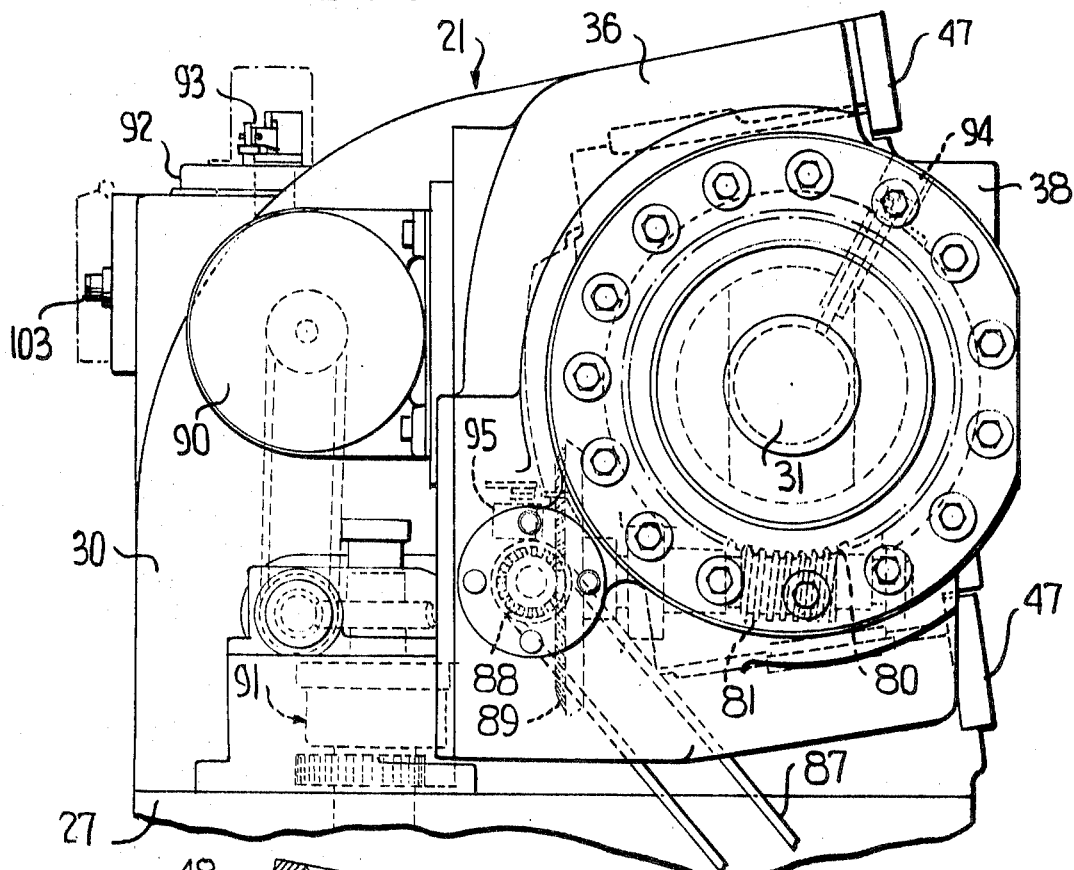
FIG. 6 is an end view of the tailstock as viewed from the right in FIG. 1.

Referring now to FIG. 5 in particular, it will be seen that the chock 38 is of a hollow construction and has housed therein in supported relation a spindle 49. The spindle 49 is rotatably journalled in bearings 50 and 51 which are separated by a spacer 52, a roller thrust bearing 53 and a bearing mount 54. It is to be noted that the bearing 51 is housed within the bearing mount 54 and is locked to the spindle 49 by a bearing retainer 55 which is secured in place by means of fasteners 56.

It is to be noted that the left end of the chock 38 (FIG. 4) is provided with a mounting ring 57 which is removably secured thereto by means of screws 58. The left end of the chock 38 is provided with a spacer 60 and a seal 61. The right end of the chock 38 is provided with a flange member 62 which is removably secured in place by fasteners (not shown) and in cooperation with the mounting ring 57 serves to longitudinally position the spindle 49 and its associated supporting components longitudinally within the chock 38.

It is to be noted that the flange member 62 is provided with a cylindrical chamber which will be identified as a cylinder 63. The cylindrical chamber 63 has a piston 64 positioned therein and the piston 64 is provided with a plurality of sealing rings 64a so as to assure the trapping of hydraulic fluid within the left end of the cylinder 63. The piston 64 is retained within the cylinder 63 by means of an end cap 65 secured by fasteners 66. The piston 64 has an extension 67 which extends out through a central opening in the end cap 65.

An enlarged end 68 of a spindle screw 69 is connected to the end cap 65 for limited longitudinal movement and in engagement with the projection 67 of the piston 64, by means of a retaining cap 70. The retaining cap 70 is suitably secured in place by means of fasteners (not shown). These fasteners also secure in place diametrically oppositely disposed keys 71 positioned between the retaining cap 70 and the end cap 65. The keys 71 engage flats on the enlarged end 68 of the spindle screw 69 to prevent relative rotation between the spindle screw 69 and the chock 38.

A spindle nut 72 is threadedly engaged on the spindle screw 69 and is rotatably journalled in bearings 74 and 75. The bearings 74 and 75 are carried by a right hand end portion of the housing 36 with a flange end 76 retaining the spindle nut and bearing assembly within the rear housing portion.

A thrust bearing 77 is carried by the spindle nut 72 and is positioned between an intermediate enlargement 78 of the spindle nut and an end portion of the flange end 76. The thrust bearing 77, serves to resist movement of the spindle nut 72 to the right when it is being rotated to effect the advancement of the chock 38.

In order that the spindle nut 72 may be rotated in order to advance or retract the chock 38, a worm wheel 80 is carried by the intermediate enlargement 78 of the spindle nut 72. The worm wheel 80 is engaged by a worm 81 which, in turn, is carried by a transversely extending shaft 82. It is to be understood that the shaft 82 may be rotated in any desired manner, either by power means or by a handwheel in order to effect the rotation of the spindle nut 72.

In the illustrated form of the invention, the shaft 82 is rotated by means of an electric motor 83 suitably mounted on the underside of the upper base 30 to the right of the lower base 27. The motor 83 is provided with a drive pulley 84 which is aligned with a driven pulley 85 carried by a longitudinally extending shaft 86 which is suitably journalled within the upper base 30. The pulleys 84 and 85 are connected together by suitable belts 87. The shaft 86 is provided with a bevelled pinion 88 which is meshed with a bevel gear 89 keyed to the shaft 82 for rotating the worm 81. It is to be understood that the motor 83 is a reversible motor so that it may be effective to selectively rotate the spindle nut 72 in opposite directions.

At this time it is pointed out that the tailstock 21 also includes an electric motor 90 which is connected to suitable drive means for effecting the longitudinal shifting of the tailstock 21 on the ways 22. The drive means, which are generally identified by the numeral 91, in no way form a part of this invention, and therefore, will not be described in detail here.

The upper base member 30 is provided with an accumulator 92 which has associated therewith a pressure actuated switch 93. The accumulator 92 and the switch 93 are removable as an assembly from the top of the upper base member 30. The tailstock 21 is provided with a hydraulic line which couples the accumulator 92 with the cylinder 63. The switch 93 is normally closed and will open when the pressure within the cylinder 63 reaches a predetermined pressure.

It is also to be understood that there is associated with the cylinder 63 a fluid supply switch 94. The switch 94 is also a normally closed switch and opens only when the supply of fluid within the cylinder 63 is inadequate for the proper operation of the tailstock 21. It is to be noted that the switch 94 is illustrated out of phase in FIG. 5 with the switch being correctly illustrated in FIG. 5.

The tailstock 21 is further provided with a limit switch which is mechanically operated. The limit switch includes two separate spring loaded switch members 95A and 95B which are normally closed and which are separately operated by a single switch operating lever 99. The limit switch member 95A is movable to an open position by means of a switch bracket 96 which is secured to the flange 62, as is best shown in FIG. 5. The switch member 95B is movable to an open position by a switch bracket 97 which is carried by the chock 38, as is also shown in FIG. 5.

As is clearly shown in FIG. 5, the forward upper part of the upper base member 30 is provided with a switch assembly 98 which includes a pair of push button operator switches 100 and 101 for controlling the energization and direction of operation of the motor 83 to advance and retract the chock 38. The switch assembly 98 also includes a pair of push button switches 102 and 103 which are operable to energize and control the direction of rotation of the motor 90 so as to advance or retract the tailstock 21 on the ways 22.

OPERATION

With particular reference to FIG. 3, it will be seen that the tailstock center 31 may be advanced when the machine is under power, before the machine cycle is started, by depressing and holding the tailstock center advance push button which effects the closing of the switch 100, as relay contact CRM1 is normally closed. Inasmuch as the switches 93, 94 and 95A are also normally closed, the closing of the switch 100 will result in the energization of control relay 2CR.

When the control relay 2CR is energized, normally open contact 2CR1 is closed and a circuit is completed through normally closed contact CRM1, newly closed contact 2CR1 and normally closed contact 2MR1 to energize control relay 2MF which controls the operation of the motor 83 in a forward direction to advance the chock 38 and the center 31 carried thereby. The chock 38 will advance until either the center 31 engages a workpiece and sufficient pressure is built up in the accumulator 92 to open the switch 93, or in the event there is no workpiece present, until the switch member 95A is open by the bracket 96.

With grinding machine 10 under power, the chock 38 and the work center 31 may be retracted before the machine cycle is started by depressing and holding the push button for the center retract switch 101. When the switch 101 is closed, a circuit through normally closed contact CRM1, the switch 101, and the switch member 95B will be completed to energize control relay 3CR. When the relay 3CR is energized, normally open contact 3CR1 will close and a circuit will be completed through the closed contact 3CR1 and normally closed contact 2MF1 to energize control relay 2MR. The energization of the relay 2MR serves to energize and operate the electric motor 83 in a reverse direction to retract the chock 38 and the associated work center 31.

The chock 38 and work center 31 will continue to retract as long as the push button for the switch 101 is held until the switch bracket 97 opens the switch member 95B to deenergize relay 3CR. At this time, contact 3CR1 will open and the relay 2MR will open.

It is pointed out at this time that the electrical circuit includes two normally closed contacts 2MR1 and 2MF1 which are safety contacts and which prevent the motor 83 from receiving a change in direction while the chock 38 is being advanced or retracted.

It will be obvious from the circuit diagram of FIG. 3 that when there is an inadequate supply of fluid within the cylinder 63 and the switch 94 opens, the circuit for relay 2CR will be rendered inoperative and further advancement of the chock 38 and the work center 31 is prevented.

It will be readily apparent from the foregoing that the construction of the tailstock 21 is such that provisions are made for a spindle 49 of a maximum diameter with the spindle 49 being supported by large capacity bearings 50 and 51 so that the grinder 10 may support very large rolls. At the same time, while the chock 38 is of a sufficient size to receive the bearings 50 and 51, that face of the chock 38 facing grinding wheel 13 may be of a thinner wall thickness in that all of the load on the bearings 50 and 51 is away from this wall portion of the chock 38. In addition, the upper base member 30 may be of a generally C-shaped construction in that when a roller is being ground, the reaction force on the tailstock 21 is forward or to the right, as viewed in FIG. 4, thereby permitting the rear or left face of the upper base member 30, as viewed in FIG. 4, to be open. Therefore, the distance from the center of the center 31 to the rear or left face of the tailstock 21, as viewed in FIG. 4, may be held to a minimum for the large size spindle and bearing assembly.

It will also be readily apparent that even though the chock 38 is not fully supported by the upper base member 30 in all directions, due to the fact that the chock 38 is tilted, as is clearly shown in FIGS. 4 and 7, the weight of the chock alone will urge the same into its seated position relative to the spindle housing 36. Furthermore, when the center 31 is supporting a roll, the weight of the roll adds to the weight of the chock 38 so as to further and more firmly lock the chock 38 in position within the housing 36 of the upper base member 30. Therefore, while portions of the upper base member 30 and the chock 38 have been omitted, there is no reduction in strength of the tailstock 21. On the other hand, by providing this added clearance, the versatility of the grinder in grinding small diameter rolls and in grinding small diameter tapers on the ends of rolls is greatly increased.

Although only a preferred embodiment of the grinder has been specifically illustrated and described herein, it is to be understood that minor variations may be made therein without departing from the spirit of the invention.

I claim:
1. In a machine tool;
a base, a tool support mounted on said base, and a tool mounted on said tool support;
a work support mounted on said base and having support means for supporting a workpiece for rotation about an axis; and
means for effecting relative transverse and longitudinal movement between said tool support and said work support;
said work support means including a tailstock particularly configurated to present a minimum obstruction to said tool support and said tool;
said tailstock including a housing having a support member slidably mounted therein, said housing and said support member having cooperating support surfaces, said housing being devoid of a wall facing the relative path of said tool support and said tool and said support surfaces being disposed only above and below said axis and at the side of said axis remote from said relative path to provide a maximum clearance between said tailstock and said tool support and said tool,
said support member carrying a spindle rotatably journalled therein, and said housing and support member construction facilitating the use of larger than normal bearings without increasing the radial dimension of the tailstock facing the tool support.
2. The machine tool of claim 1 wherein said support member has a minimal wall facing said relative path.
3. In a machine tool;
a base, a tool support mounted on said base, and a tool mounted on said tool support;
a work support mounted on said base and having support means for rotatably supporting a workpiece; and
means for effecting relative transverse and longitudinal movement between said tool support and said work support;
said support means including a tailstock particularly configurated to present a minimum obstruction to said tool support and said tool;
said tailstock including a housing having a support member slidably mounted therein, said housing and said support member having cooperating support surfaces and said support surfaces being primarily disposed remote from the relative path of said tool support and said tool with portions of said tailstock opposing said relative path being minor as compared to the remainder of said tailstock to provide a maximum clearance between said tailstock and said tool support and said tool,
said cooperating support surfaces transversely slanting in directions to urge said support member to a seated position within said housing in a direction generally opposite from said relative path with said seated position of said support member being substantially that to which said support member is urged by machining contact between said tool and a workpiece.
4. In a machine tool;
a base, a tool support mounted on said base, and a tool mounted on said tool support;
a work support mounted on said base and having support means for rotatably supporting a workpiece; and
means for effecting relative transverse and longitudinal movement between said tool support and said work support;
said support means including a tailstock particularly configurated to present a minimum obstruction to said tool support and said tool;
said tailstock including a housing having a support member slidably mounted therein, said housing and said support member having cooperating support surfaces and said support surfaces being primarily disposed remote from the relative path of said tool support and said tool with portions of said tailstock opposing said relative path being minor as compared to the remainder of said tailstock to provide a maximum clearance between said tailstock and said tool support and said tool,
said housing being of a generally rectangular C-shaped cross section opening towards said relative path, and said support member being substantially rectangular in section and seated within said housing.
5. A machine tool of claim 4 wherein said housing is slightly rotated about the general axis thereof with said housing opening upwardly with said support member being seated within said housing remote from said relative path due to the weight of said support member.
6. The machine tool of claim 4 wherein said housing is slightly rotated about the general axis thereof with said housing opening upwardly with said support member being seated within said housing remote from said relative path due to the weight of said support member;
certain of said support surfaces being slanted internal wall surfaces of said housing including a bottom wall surface and an upstanding wall surface disposed remote from said relative path, and said support member being primarily supported by said surfaces.
7. In a machine tool;
a base, a tool support mounted on said base, and a tool mounted on said tool support;
a work support mounted on said base and having support means for rotatably supporting a workpiece; and
means for effecting relative transverse and longitudinal movement between said tool support and said work support;
said support means including a tailstock particularly configurated to present a minimum obstruction to said tool support and said tool;
said tailstock including a housing having a support member slidably mounted therein, said housing and said support member having cooperating support surfaces and said support surfaces being primarily disposed remote from the relative path of said tool support and said tool with portions of said tailstock opposing said relative path being minor as compared to the remainder of said tailstock to provide a maximum clearance between said tailstock and said tool support and said tool,
said housing carrying feed means connected to said support member for effecting longitudinal movement of said support member relative to said housing, and said feed means having incorporated therein a fluid system for indicating the longitudinal force applied on a workpiece by said tailstock, said fluid system including a closed circuit piston and cylinder arrangement.
8. The machine tool of claim 7 together with means coupled to said fluid system and to said feed means for rendering said feed inoperative in an advancing direction when said hydraulic system has an insufficient supply of fluid.
9. The machine tool of claim 7 together with a control circuit operative for controlling the operation of said feed means for effecting relative longitudinal movement of said support member;
said control circuit including a tailstock motor operable in two directions and controllable to selectively advance and retract said support member relative to a workpiece.
10. The machine tool of claim 7 together with a control circuit operative for controlling the operation of said feed means for effecting relative longitudinal movement of said support member;
   said control circuit including a tailstock motor operable in two directions and controllable to selectively advance and retract said support member relative to a workpiece;
   said control circuit including a fluid safety switch operable to stop advancing movement of said support member when an inadequate supply of fluid exists within said hydraulic system.

References Cited
UNITED STATES PATENTS

| | | | |
|---|---|---|---|
| 2,838,884 | 6/1958 | Balsiger | 51—237 X |
| 2,161,311 | 6/1939 | Ott | 51—49 |
| 3,070,925 | 1/1963 | Woodford | 51—49 |

HAROLD D. WHITEHEAD, Primary Examiner

U.S. Cl. X.R.

51—237 R